United States Patent
Bach-Preckwinkel et al.

(10) Patent No.: US 12,188,449 B2
(45) Date of Patent: Jan. 7, 2025

(54) PITCH DRIVE CONTROLLER FOR A WIND TURBINE, PITCH DRIVE CONTROL DEVICE, AND METHOD FOR CONTROLLING A PITCH DRIVE CONTROLLER

(71) Applicant: KEBA Industrial Automation Germany GmbH, Lahnau (DE)

(72) Inventors: Heiko Bach-Preckwinkel, Lahnau (DE); Harald Wertz, Lahnau (DE); Daniel Jotzo, Lahnau (DE); Frank Niermann, Lahnau (DE); Stefan Budde, Lahnau (DE); Bernd Borgschulte, Lahnau (DE)

(73) Assignee: KEBA INDUSTRIAL AUTOMATION GERMANY GMBH, Lahnau (DE)

(*) Notice: Subject to any disclaimer, the term of this patent is extended or adjusted under 35 U.S.C. 154(b) by 0 days.

(21) Appl. No.: 17/763,661

(22) PCT Filed: Sep. 24, 2020

(86) PCT No.: PCT/EP2020/076739
§ 371 (c)(1),
(2) Date: Mar. 25, 2022

(87) PCT Pub. No.: WO2021/058654
PCT Pub. Date: Apr. 1, 2021

(65) Prior Publication Data
US 2022/0341392 A1 Oct. 27, 2022

(30) Foreign Application Priority Data
Sep. 25, 2019 (DE) ...................... 10 2019 125 789.1

(51) Int. Cl.
*F03D 7/02* (2006.01)

(52) U.S. Cl.
CPC ...... *F03D 7/0224* (2013.01); *F05B 2260/845* (2013.01); *F05B 2270/328* (2013.01)

(58) Field of Classification Search
CPC .. F03D 7/0224; F03D 7/047; F05B 2260/845; F05B 2270/328; Y02E 10/72
See application file for complete search history.

(56) References Cited

U.S. PATENT DOCUMENTS

| | | | |
|---|---|---|---|
| 2009/0169378 A1* | 7/2009 | Menke | F03D 7/024 416/40 |
| 2016/0245257 A1 | 8/2016 | Jensen | |
| 2018/0180023 A1* | 6/2018 | Wiesenthal | F03D 7/0224 |

FOREIGN PATENT DOCUMENTS

| | | |
|---|---|---|
| CN | 101624969 A | 1/2010 |
| CN | 110439746 A | 11/2019 |

(Continued)

*Primary Examiner* — Jacob M Amick
*Assistant Examiner* — Charles J Brauch
(74) *Attorney, Agent, or Firm* — LEYDIG, VOIT & MAYER, LTD.

(57) ABSTRACT

A pitch drive controller for a wind turbine having a plurality of rotor blades fixed on a rotor hub for rotational adjustment of the rotor blades on the rotor hub by an electric motor includes a pitch drive control device for each of the rotor blades. The pitch drive control device is in each case configured to actuate a pitch drive motor. The pitch drive control device has in each case an electronic actuation unit for the respective pitch drive motor, a control output to the respective pitch drive motor and a computing unit with a processor configured to operate the respective pitch drive control device. The drive control device has in each case a local communication connection and is connected or connectable to the other pitch drive control devices of the wind turbine in a cross-communication via the local communication connection.

15 Claims, 1 Drawing Sheet

(56) References Cited

FOREIGN PATENT DOCUMENTS

| | | |
|---|---:|---|
| EP | 1763126 A1 | 3/2007 |
| EP | 2495435 A1 | 9/2012 |
| GB | 2545719 A | 6/2017 |
| GB | 2568493 A | 5/2019 |
| NZ | 556642 A | 10/2009 |
| WO | WO 2017157912 A1 | 9/2017 |

\* cited by examiner

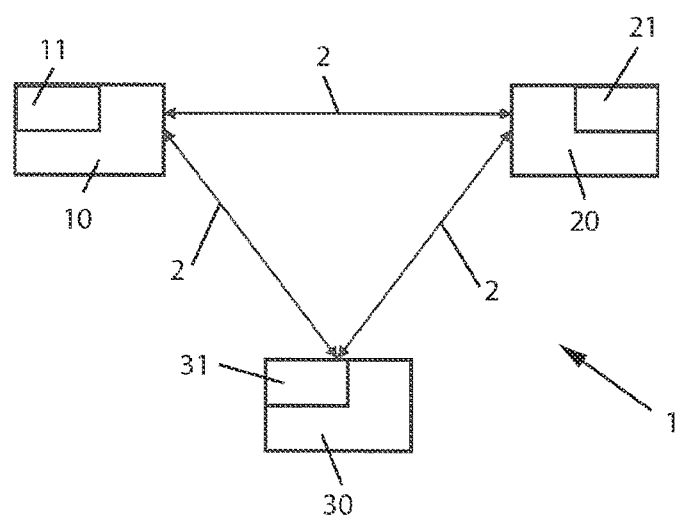

PITCH DRIVE CONTROLLER FOR A WIND TURBINE, PITCH DRIVE CONTROL DEVICE, AND METHOD FOR CONTROLLING A PITCH DRIVE CONTROLLER

CROSS REFERENCE TO RELATED APPLICATIONS

This application is a U.S. National Phase application under 35 U.S.C. § 371 of International Application No. PCT/EP2020/076739, filed on Sep. 24, 2020, and claims benefit to German Patent Application No. DE 10 2019 125 789.1, filed on Sep. 25, 2019. The International Application was published in German on Apr. 1, 2021 as WO 2021/058654 A1 under PCT Article 21(2).

FIELD

The present invention relates to a pitch drive controller for a wind turbine, a pitch control device and a method for controlling a pitch drive controller.

BACKGROUND

Pitch inverters (or more generally, pitch actuation devices) are usually connected via a field bus to a central controller, which sends setpoints to the inverters and receives measured values. There is no direct communication connection between the pitch inverters. Therefore, all communication between the pitch inverters must take place via the central controller.

SUMMARY

In an embodiment, the present invention provides a pitch drive controller for a wind turbine having a plurality of rotor blades fixed on a rotor hub for rotational adjustment of the rotor blades on the rotor hub by an electric motor. The pitch drive controller includes at least one pitch drive control device for each of the rotor blades. The at least one pitch drive control device is in each case configured to actuate at least one pitch drive motor. The at least one pitch drive control device has in each case an electronic actuation unit for the respective at least one pitch drive motor, a control output to the respective at least one pitch drive motor and a computing unit with at least one processor configured to operate the respective at least one pitch drive control device. The at least one pitch drive control device has in each case a local communication connection and is connected or connectable to the other pitch drive control devices of the wind turbine in a cross-communication via the local communication connection.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

The only FIG. 1 is a schematic representation of a pitch drive controller with three pitch drive control devices embodied as inverters according to an embodiment of the invention.

DETAILED DESCRIPTION

In an embodiment, the invention provides a pitch drive controller of a wind turbine, having a plurality of rotor blades fixed on a rotor hub for rotational adjustment of the rotor blades on the rotor hub by electric motor. The pitch drive controller has at least one pitch drive control device for each rotor blade for actuating at least one pitch drive motor. Accordingly, one pitch drive control device or also more than one pitch drive control device is used for the rotational adjustment of each of the rotor blades by electric motors, wherein the individual pitch drive control devices each actuate one pitch drive motor or they each also actuate more than one pitch drive motor. It is also possible that each of the individual pitch drive motors is or may be actuated by more than one pitch drive control device. In this context, the actuation of a pitch drive motor by more than one pitch drive control device may be effected in such manner that the pitch drive motor is actuated simultaneously by more than one pitch drive control device, or that it is only actuated by one pitch drive control device at any given time, but the actuation may be switched from one pitch drive control device to another pitch drive control device.

Each of the pitch drive control devices is equipped with actuation electronics for the pitch drive motor and a control output to the pitch drive motor, wherein the pitch drive motor is supplied particularly with the electrical power needed to drive it from the actuation electronics via the control output. Further, the capability may be provided for exchanging sensor signals between the pitch drive control device and the pitch drive motor via the control output or a dedicated signal interface.

Each pitch drive control device further contains a computing unit with at least one processor configured to operate the pitch drive control device.

Optionally, a pitch actuation device according to an embodiment of the invention may also be equipped with an external communication connection to a central controller of the wind turbine. In a preferred embodiment, at least one of the pitch actuation devices of the pitch drive controller according to the invention has such an external communication connection to a central controller of the wind turbine. In this way, the ganged pitch actuation devices are able to communicate with the central controller at least via the at least one pitch actuation device which has the external interface. In a preferred embodiment according to the invention, more than one or also all pitch actuation devices of the pitch drive controller may also be equipped with such an external communication connection. Redundancy is thus increased.

Further, the individual pitch drive control devices may each include one or more than one application module, which has one or more than one processor for operating the drive control device, and/or one or more than one additional interface for optical or electrical signals.

Embodiments of the invention also provide a pitch drive control device and a method for controlling a pitch drive controller.

The actuation electronics of each of the pitch actuation devices often comprises an inverter, via which the pitch drive motor is actuated. In view of this, "pitch actuation devices" are also referred to as "pitch inverters". Both of these terms are used herein synonymously. Accordingly, as used herein, a "pitch inverter" is always understood to describe more generally a "pitch actuation device" as well, regardless of whether or not the electronics of the "pitch actuation device" actually includes an inverter for converting between alternating current and direct current. Any specific electrical means by which the pitch drive motor can be actuated by the pitch drive control device can be used according to embodiments of the invention.

As mentioned above, such pitch inverters (or more generally, pitch actuation devices) are usually connected via a field bus to a central controller, which sends setpoints to the inverters and receives measured values. There is no direct communication connection between the pitch inverters. Therefore, all communication between the pitch inverters must take place via the central controller. This is expensive and time-consuming. Furthermore, as a result of disruptions in the relatively long communication path or in the central controller, it can happen that certain information may no longer be present in the pitch inverters.

Embodiments of the present invention provide for improving communication between the pitch drive control devices of the individual rotor blades of a rotor hub.

For this purpose, in a pitch drive controller of the type described above, it is provided that each of the pitch drive control devices has a local communication connection and is connected via said local communication connection to the other pitch drive control devices of the wind turbine in a cross-communication. In particular, all the pitch drive control devices that are connected to each other in the cross-communication are arranged in the same rotor hub of the wind turbine. In this configuration, short communication paths in the cross-communication of all pitch drive control devices of the pitch drive controller are achieved. Each of the pitch drive control devices is thus able to communicate the communication connection and the communication channel arising therefrom with the other pitch drive control devices and exchange data without the need to communicate with the central controller of the wind turbine.

In one embodiment according to the invention, this cross-communication may have the form of a field bus communication. The field bus is a means for ensuring robust, reliable communication for an industrial environment and enables the connection of multiple pitch drive control devices in a closed databus wiring arrangement. Extensions or redundancies in the wiring arrangement can be created easily in a databus wiring arrangement.

In another embodiment according to the invention, the cross-communication have the form of point-to-point-communication. This is advantageously achieved by a direct wiring arrangement between two communication partners. This enables the use of simple, robust communication protocols.

In a further embodiment according to the invention, the cross-communication may take place via one or more network nodes, which also enable simple, robust communication protocols.

According to an embodiment of the invention, the pitch drive control devices of the pitch drive controller may be configured to exchange one or more of the data types defined below:
- Setpoints, in particular of the controller for rotor blade positioning
- Actual values, in particular of the controller for rotor blade positioning
- Measured values that are received and/or captured by sensors connected to the pitch drive control device
- Calculated values, in particular calculated from the received and/or captured measured values
- Operating parameters of the pitch drive control device, including the software status of application software and/or firmware, or of a data processing program that can be installed with the application software and/or the firmware or software updates
- Absolute or relative time information
- Data packets from safety modules of the pitch drive control devices themselves, the pitch drive controller and/or the central controller of the wind turbine The data values may be exchanged in particular in the course of the methods or method steps which will be described in greater detail in the following text. For this purpose, the computing unit of the pitch actuation devices is configured to execute the respective method steps, optionally in cooperation with the computing unit of at least one further pitch actuation device, wherein the cooperating pitch actuation devices are connected to each other via the cross-communication according to an embodiment of the invention.

According to a preferred embodiment of the pitch drive controller according to the invention, at least one pitch drive control device with an external communication connection to a central controller of the wind turbine is provided in the pitch drive controller. In this way, it is possible to operate communication with a central controller (central communication) and the cross-communication (local communication) according to an embodiment of the invention in parallel. Then, the pitch drive controller according to an embodiment of the invention and/or the pitch drive control devices according to an embodiment of the invention may be operated with the (additional) cross-communication in conventional wind turbines with central controller as well, as control is generally provided centrally and supplemented by the cross-communication, for example additional control and safety features, as described in this document. This results in considerably improved, safer operation of the wind turbines. In a preferred embodiment of this parallel operation of central communication and cross-communication (local communication), it may be provided that at least one pitch drive control device for each pitch drive (in particular in the sense of pitch drive motor) also has the external communication connection as well as the local communication connection. According to an embodiment of the invention, the local and the central communication may be assured in technical terms by means of a common (i.e. the same) communication, for example a field bus communication for example with the respective corresponding local or central communication addresses. However, it is also possible according to an embodiment of the invention that technically different communication types and thus also separate and preferably independently working communication systems are used. This increased redundancy, for example by enabling the cross-communication according to an embodiment of the invention to assume safety controlling autarchically if the central communication fails.

If not every pitch drive control device—or at least not one of possibly multiple pitch drive control devices for a pitch drive motor for adjusting a rotor blades—does have an external communication connection with the central communication to the central controller, the computing unit of the/a pitch drive control device designed with the external communication connection may be configured to assume a gateway function and to relay communication between the central controller and the pitch drive control devices which are only equipped with local cross-communication. This function may also be used in the event if an external communication connection of a pitch drive control device fails, by assuring communication with the central controller via another pitch drive control device functioning as the gateway.

Another embodiment of the invention provides a pitch drive control device for actuating a pitch drive motor, wherein the pitch drive control device has an electronic actuation unit, a control output to the pitch drive motor, a computing unit with a processor configured to operate the pitch drive control device, and optionally an external communication connection to a central controller of the wind turbine. According to an embodiment of the invention, it is provided that the pitch drive control device has a local communication connection and is connectable to the other pitch drive control devices of the wind turbine in a cross-communication via said local communication connection. A plurality of these pitch drive control devices which are connected via the cross-communication then form the pitch drive controller of the wind turbine. In usual wind turbines with three rotor blades it is correspondingly usual to provide at least three pitch drive control devices as well.

According to an embodiment of the invention, the cross-communication is in particular designed such that it only takes place with other pitch drive control devices of the wind turbine, in particular only with the pitch drive control devices that are accommodated in the same rotor hub of the wind turbines. This may be ensured for example by restricting the lengths of the cables that are and/or can be used for cross-communication, for example as part of a field bus communication or a point-to-point connection. Correspondingly, an embodiment of the invention provides for the use of such a pitch drive control device in a cross-communication of pitch drive control devices in the same rotor hub of a wind turbine.

According to an embodiment of the invention, the local communication connection may comprise a cabled electrical and/or optical interface. In principle, a wireless cross-communication with standard wireless communication interfaces is also conceivable. However, in the context of a wind turbine, a cable-based communication typically proves to be more robust and more reliable. The communication connection may preferably be designed to create a field bus data link or a proprietary data link. An optical cross-communication is particularly impervious to electromagnetic interference fields; however, a cabled electrical data link is typically also able to ensure reliable communication, possibly with appropriate shielding of the data line.

In an embodiment according to the invention, the pitch drive control device may include integrated and/or connectable sensors (at least one sensor) for capturing measured values. The computing unit of the pitch actuation device is then configured to process the captured measured values. Processing of the measured values may consist of evaluating the measured values and/or transmitting the measured values to the central server. This enables a pitch drive control device to determine the state of hardware components and/or the states of the wind turbine by monitoring measurement variables and/or operands (calculation values), for example by threshold detection, checking against a valid value range, long-term evaluation of an average value, fast Fourier transforms (FFT) to decompose a digital signal into its frequency components and analyse them, calculation of frequency distributions (histogram), adaptation of a characteristic curve or characteristic diagram, use as training data for an artificial neural network or the like.

In a further embodiment according to the invention, a check of at least one sensor in the pitch drive control device may be performed by comparing the measured value thereof with the measured value of at least one corresponding sensor in at least one of the other pitch drive control devices, preferably in the same wind turbine or also in neighbouring wind turbines. In this case, it is assumed that the measured value under consideration is identical or at least identical within a given tolerance in the measurements in the pitch drive control devices considered. The measured value considered for this purpose may be for example the voltage frequency of the electrical supply network, or its voltage may also be suitable for this purpose. Inside a wind turbine, a temperature measurement may also be used for this purpose, by implementing a temperature sensor outside of the pitch drive control device, for example, in particular a temperature sensor arranged on an emergency power supply. In particular, the computing unit of a pitch drive control device (or several or all of the pitch drive control devices in the one wind turbine or also in multiple wind turbines) may be configured to carry out the check of the sensor, wherein the sensor may be integrated in the pitch actuation device or connected to a sensor connection of the pitch actuation device.

In a further embodiment according to the invention, a signal conversion of more than one sensor of the pitch drive control device may be carried out within one pitch drive control device by one (the same) analogue-digital converter (ADC) of the pitch drive control device. According to an embodiment of the invention, a check of this one ADC may be performed by comparing an analogue-to-digital measured value converted thereby with the measured value of at least one corresponding sensor in at least one other pitch drive control device (for example in the same wind turbine or also in neighbouring wind turbines, i.e. with similar ambient and/or operating conditions. In this case, it is assumed that the measured value under consideration is identical or at least identical within a given tolerance in the measurements in the pitch drive control devices considered. The measured value considered for this purpose may be for example the voltage frequency of the electrical supply network, or its voltage may also be suitable for this purpose. Inside a wind turbine, a temperature measurement may also be used for this purpose, by implementing a temperature sensor outside of the pitch drive control device, for example, in particular a temperature sensor arranged on an emergency power supply. In particular, the computing unit of a pitch drive control device (or several or all of the pitch drive control devices in the one wind turbine, for example, or also in multiple wind turbines) may be configured suitably to carry out the check.

In a further embodiment according to the invention, the pitch drive control device may comprise a safety module, in which safety functions are implemented and can be executed on the basis of data captured and processed in the safety module. According to an embodiment of the invention, the captured data preferably also include data received from at least on pitch drive control device in the cross-communication, wherein the computing unit of the pitch drive control device is configured to evaluate this data in the safety module as well. In this way, the ganging of the pitch drive control devices through the cross-communication makes it possible to achieve a redundancy without having to achieve such a redundancy in one pitch drive control device individually. This results in cost advantages while increasing safety, particularly if—as is common in wind turbines—at least three rotor blades are each equipped with their own pitch drive control device. This then inevitably creates double redundancy without the need to provide further components in the one pitch drive control device.

An important advantage may be realised if the computing unit of the pitch drive control device according to one possible embodiment of the invention is configured to transmit measured values and/or setpoints for rotational adjustment of the rotor blade to other pitch drive control devices connected in the cross-communication and/or to receive them from other pitch drive control devices. On the basis of received measured values and/or setpoints, the computing unit can then intervene locally in the pitch drive control. In this context, the local cross-communication in the rotor hub of the wind turbine enables particularly rapid communication with significantly shorter latency than a communication to the central controller of the wind turbine. This improves the dynamics of the pitch drive control considerably.

Further, the computing unit of the pitch drive control device may be configured to receive measured values and/or setpoints and/or calculation values from other pitch drive control devices and to check measured values it captured in the pitch drive control device against an expected value from the measured values and/or setpoints and/or calculation values received from the other pitch drive control devices. This serves to improve monitoring and diagnostics, because these functions can be carried out with current data and locally in the pitch drive control device.

In a further preferred embodiment according to the invention, the pitch drive control device may have an input interface with a user input device and at least one display device. The user input device may have keys to facilitate user input. The display device may be a display or simply consist of one or more light signals, e.g., LEDs. In this way, it is possible to parameterise and adjust the pitch drive control device easily when commissioning at the installation site, for example, i.e. usually in the rotor hub of the wind turbine. The available space there is typically very limited. This makes the use of commissioning and service devices such as laptops more difficult. In many cases, the input interface (Human Machine Interface HMI) renders additional devices for servicing or commissioning unnecessary.

A further simplification of the communication process may be achieved according to the invention by the cross-communication in that the computing unit of the pitch drive control device according to one embodiment is configured to transmit setting parameters of the pitch drive control device and/or an installable image of the software to another of the pitch drive control devices via the cross-communication and to save them in the other pitch drive control device. The setting parameters may in particular be able to be input and/or defined in the software for controlling the pitch drive control device. By entering these setting parameters, the pitch drive control device may be configured for the specific wind turbine during commissioning. The installable image of the software may be for example an installation file for configuring the application software on the computing unit of the pitch drive control device (also including updates therefor) and/or a software image of the pitch drive control device. In this way, in this embodiment of the invention a complete backup of the pitch drive control device is created (also) locally in the other pitch drive control devices of the wind turbine that are addressable via the cross-communication, and which can also be accessed in the cross-communication.

For this purpose, in a refinement of this embodiment of the invention, when replacing one of the pitch drive control devices of the wind turbine the computing unit of the pitch drive control device may be configured to retrieve the (previously saved) setting parameters of the pitch drive control device and/or the installable image of the software from one of the other pitch actuation devices via the cross-communication and to set it up in the computing unit of the substituted pitch drive control device. This can be done based on an interaction with the user via the input interface and/or by an automated query of the pitch drive control devices that can be reached via the cross-communication. With such an installation of a software image and/or of all settable parameters (e.g., setting parameters that can be entered or defined via the software) it is possible for the substitute device to a paramaterised in exactly the same way as the replaced device. This simplifies servicing operations of the wind turbine.

For the purposes of the present document, the replacement of one of the pitch drive control devices described above is understood to mean not only the replacement of the entire device but also the replacement of an application module of a pitch drive control device for which the software and/or parameter settings apply and which uses them. For example, the open- and closed-loop control software may be implemented on an application module. Even when an application module of the pitch drive control device is replaced, the newly introduced application module may be parameterised or receive software from another pitch drive control device via the cross-communication, the parameters or software being installed on the newly installed application module. This is also what is meant by the phrase "replacing one of the pitch drive control devices".

A further embodiment of the invention provides a method for controlling the pitch drive controller of a wind turbine described previously, having at least two, preferably three pitch drive control devices, which in particular are arranged in a rotor hub of the wind turbine and may have the previously described construction. According to an embodiment of the invention, the computing units of the pitch drive control devices are configured to communicate with each other and to exchange data with each other by means of the cross-communication (preferably inside the rotor hub), and explicitly not via a central controller of the wind turbine (which is usually arranged outside of the rotor hub) and/or store said data. In this context, the method may in particular execute the method steps explained earlier individually, together or in any combination.

Correspondingly, the computing units of the pitch drive control devices may in particular be configured to execute one or more of the following method steps:

Transmitting and storing the setting parameters of one of the pitch drive control devices and/or an installable image of the software of this one of the pitch drive control devices to another of the pitch drive control devices by means of the cross-communication;

Reading out the setting parameters and/or the stored installable image of the software stored in one of the pitch drive control devices by means of the cross-communication and installing them in another of the pitch drive control devices;

Receiving measured values and/or setpoints and/or calculation values from other pitch drive control devices by means of the cross-communication and checking a measured value and/or calculation value captured in the pitch drive control device itself against an expected value which is derived from measured values and/or setpoints and/or calculation values received from the other pitch drive control devices;

Sending measured values and/or setpoints and/or calculation values for rotational adjustment of the rotor blade to other pitch drive control devices connected in the cross-communication;

Receiving measured values and/or setpoints and/or calculation values for rotational adjustment of the rotor blade from other pitch drive control devices by means of the cross-communication and local intervention in the pitch drive control based on the measured values and/or setpoints and/or calculation values received;

Receiving data also at least from at least one pitch drive control device by means of the cross-communication and evaluating said data in the safety module for the purpose of implementing safety functions.

According to embodiments of the invention, these and other methods and method steps or parts thereof, as described herein, which are based on the cross-communication according to an embodiment of the invention, may be implemented to increase the dynamics of control and maintenance and improve the safety of wind turbines.

Further advantages, features and options for use of embodiments of the invention will be discernible from the following description of exemplary embodiments and the drawing. In this context, all features described textually and/or depicted in images constitute embodiments of the invention, together or in any technically plausible combination, also regardless of their combination in described or illustrated exemplary embodiments.

The only FIG. 1 is a schematic representation of a pitch drive controller 1 with three pitch drive control devices 10, 20, 30 embodied as inverters, which are arranged in a rotor hub of a wind turbine. Besides a communication connection to a central controller of the wind turbine, the inverters 10, 20, 30 (also used in the following text synonymously with pitch drive control device) are connected to each other in a cross-communication 2, which is realised locally and connects each of the inverters 10, 20, 30 to each other directly, as shown by the arrows.

Each of the inverters 10, 20, 30 is equipped with a computing unit, which is configured to control the inverter 10, 20, 30 in technically conventional manner. The computing unit is also set up to execute the cross-communication 2, according to which the inverters are able to exchange data with each other directly in the manner described.

In order to allow the inverters 10, 20, 30 to be addressed locally even without a dedicated installation device and inputs to be made, each of the inverters 10, 20, 30 has a local input interface 11, 21, 31 for user input and user information (Human Machine Interface HMI).

Without limitation to the methods and method steps described hereinafter, the following functions in particular may be implemented for execution in the computing units, and can be put to use very beneficially, especially in the environment of wind turbines.

As is explained below, the cross-communication can be used to good advantage during a service operation involving replacement of one of the inverters, wherein as part of the method steps implemented all or also any selection of the following methods or functions can be implemented together.

Via the cross-communication 2 of inverters 10, 20, 30, an image of the (parameter) settings and preferably also of the software of one of the inverters 10 or 20 or 30 is transmitted to the other two inverters 20, 30 or 10, 30 or 10, 20 and stored there. Then, if one of the inverters 10 or 20 or 30 has to be replaced due to a hardware malfunction, this can be detected by the remaining two inverters 20, 30 or 10, 30 or 10, 20 based on a different serial number, for example. By simple interaction (e.g., pressing a key) with the user (in particular via the corresponding input interface 11 or 21 or 31), a process (method) is started according to which the settings and preferably the software as well from the images stored in at least one of the remaining two inverters 20, 30 or 10, 30 or 10, 20 are loaded onto the newly fitted inverter 10 or 20 or 30 via the cross-communication 2. Successful loading may be indicated explicitly by a LED on the input interface 11 or 21 or 31. The process for detecting and reloading an image may possibly also be initiated automatically, without the user pressing a key, for example following detection of a new inverter 10 or 20 or 30 by identification of a new serial number in the cross-communication with the other two inverters 20, 30 or 10, 30 or 10, 20.

After successful loading, the new inverter 10 or 20 or 30 has received exactly the same software and parameter data that were used to operate the replaced device as well. It behaves in exactly the same way.

One procedure for replacing an inverter which is routine in the related art is to either preset the inverter manually with a laptop before moving it into the rotor hub of the wind turbine or to make the settings on site in the rotor hub with a laptop as commissioning device. These practices both involve increased logistical investment, and it must be known precisely which inverter in the hub is defective before undertaking the service operation. Moreover, the problem may arise in that in the event of a fault in the old inverter, it may no longer be possible to export the parameters from that inverter. This will then require complete reconfiguration, if the setting parameters have been saved separately somewhere and updated.

With the method according to an embodiment of the invention, a defective inverter 10 or 20 or 30 can be replaced and settings can be made in the rotor hub without complex or additional equipment (e.g., laptop as commissioning device). This is particularly advantageous given the limited space conditions inside the rotor hub.

After the method according to an embodiment of the invention has been completed, the new inverter 20, 30 or 10, 30 or 10, 20 also receives an exact image of the settings and preferably also the software of the faulty inverter 10 or 20 or 30, so that after replacement it behaves exactly as its predecessor did. The procedure is considerably less prone to errors than the replacement methods employed in the related art, while also saving time on the inverter replacement. As preconfiguration is no longer performed, the logistics of spare parts is also simplified.

A further advantageous function of the cross-communication 2 provided according to an embodiment of the invention is gained due to the fact that the inverters 10, 20, 30 can exchange measured values, control variables or variable calculated in their own units with each other synchronously. Even today, it is already routine for an individual inverter 10, 20, 30 to be able to determine the status of hardware components by monitoring measured values (e.g., threshold detection, testing against a valid value range, long-term evaluation of the average, fast Fourier transforms, etc.), for example from captured sensor data or other control variables. This has the effect of improving status monitoring for the individual inverters 10, 20, 30 significantly.

Diagnostics (e.g., for locating faults or optimising the setting parameters) may be improved by comparing with corresponding data from multiple inverters 10, 20, 30 that are operated in the same wind turbine. Until now, such diagnostics were typically performed by offline evaluation of measurement data from many field devices at a central site. With the cross-communication 2 it becomes possible to perform such an evaluation with the data from—for example—three inverters 10, 20, 30 effectively online, in the inverters 10, 20, 30 which are connected to each other via the cross-communication in the same rotor hub. This diagnostics procedure is effectively online because the data needed are transmitted so fast via the cross-communication 2 that they are available in the inverters 10, 20, 30 de facto instantaneously.

Each inverter 10, 20, 30 can compare the measured data with the current values or also values from a long-term memory with the values from the two parallel inverters 20, 30 or 10, 30 or 20, 30. In this case, the compare of measured values (such as temperatures) for conformance with a tolerance band is conceivable for example between the inverters 10, 20, 30.

A measured value of an inverter 10, 20, 30 that is to be evaluated may thus be checked against an expected value by the measured data of two other inverters 20, 30 or 10, 30 or 20, 30. This can increase the diagnostic depth.

In a further embodiment, it is also possible for diagnostic data to be exchanged with inverters in wind turbines in the same wind farm or manufacturer's fleet via an external communication channel, which further increases diagnostic capabilities.

The cross-communication 2 according to an embodiment of the invention also enables rapid local intervention in pitch controlling by a pitch drive control device 10, 20, 30 only for the rotor blade that is adjusted by the pitch drive control device 10, 20, 30. This is explained below.

In the related art, each inverter 10, 20, 30 receives a position setpoint, e.g., for the rotational positioning of the rotor blade via the central controller of the wind turbine. If the pitch drive control is intended to respond for this individual rotor blade when the rotor is in specific positions (e.g., when the rotor blade passes in front of the wind turbine tower), this must be effected by a modified setpoint instruction via the central controller. Because of the delay in the field bus transmission (typically used for this purpose) such dynamics in the pitch drive control is only possible up to a certain limit, as the measured values of the inverters 10, 20, 30 must first be requested by the central controller, and a new rotational position value must be calculated therefrom.

The cross-communication according to an embodiment of the invention enables such an intervention in the pitch control of the rotor blades locally inside the inverters 10, 20, 30. The control latencies due to the time taken to transmit data between the inverter 10, 20, 30 and the central controller are reduced, and the dynamics of the pitch drive control 1 is improved.

It is also conceivable that for example measured values for the inverter 10, 20, 30 of the preceding rotor blade in the direction of rotation may be used to control the pitch of the following blade which trails by 120° (e.g., predictive load torque precontrol). The value of 120° is determined for a preferred embodiment of the wind turbines having three rotor blades arranged with equal angular offset. However, this inventive thought is not limited to such a rotor blade number or arrangement and can be transferred to any other number or arrangement.

It is also conceivable that rotor status data may be calculated from the temporally synchronous measured data of the three inverters 10, 20, 30. A possible approach in this case is to determine the position or angular speed of the rotor from the measured data from acceleration or current sensors. With the aid of the measured data from the other inverters 20, 30 or 10, 30 or 10, 20, the evaluation can be carried out redundantly and thus in a way that guarantees function. In addition, torque paths or current paths of the parallel inverters may also be incorporated into the calculation.

A further advantage of the cross-communication 2 is also realised with safety modules in the inverters 10, 20, 30. In inverters 10, 20, 30, safety functions are implemented inside "safety modules", and these are configured in particular to shut down the system safely in the event of malfunctions. For this purpose, the data captured and processed in the safety modules are capture and checked for plausibility according to the require Safety Integrity Level, often redundantly (i.e. on two channels, with the presence of dual sensors, for example). With the cross-communication 2 according to an embodiment of the invention, the necessary redundancy can be assured between the inverters 10, 20, 30 that are in the cross-communication grouping. For this purpose, the safety-critical measured data and variables calculated therefrom are transferred to the safety modules of the neighbouring inverters 20, 30 or 10, 30 or 20, 30 via the cross-communication and are checked for plausibility in a redundant calculation. Checksum calculation methods can be used for this.

Cost advantages can be gained by dispensing with the redundancy in the individual inverters 10, 20, 30, i.e. for example multiple provisions of the same sensors.

The methods, method steps or functions described in the preceding text show the great value of the cross-communication 2 according to an embodiment of the invention between pitch drive control devices 10, 20, 30 provided in a common rotor hub of a wind turbine. Above and beyond these applications, the cross-communication 2 according to an embodiment of the invention may also be used advantageously in the realisation of methods, method steps or functions.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Pitch drive controller
2 Cross-communication

10 Pitch drive control device embodied as inverter
11 Input interface
20 Pitch drive control device embodied as inverter
21 Input interface
30 Pitch drive control device embodied as inverter
31 Input interface

The invention claimed is:

1. A pitch drive controller for a wind turbine having a plurality of rotor blades fixed on a rotor hub for rotational adjustment of the rotor blades on the rotor hub by an electric motor, the pitch drive controller comprising:
at least one pitch drive control device for each of the rotor blades configured to actuate at least one pitch drive motor, the at least one pitch drive control device having in each case an electronic actuation unit for the respective at least one pitch drive motor, a control output to the respective at least one pitch drive motor and a computing unit with at least one processor configured to operate the respective at least one pitch drive control device, the at least one pitch drive control device having in each case a local communication connection and being connected or connectable to the other pitch drive control devices of the wind turbine in a cross-communication via the local communication connection.

2. The pitch drive controller according to claim 1, wherein the cross-communication is embodied as a field bus communication.

3. The pitch drive controller according to claim 1, wherein the cross-communication is embodied as a point-to-point-communication.

4. The pitch drive controller according to claim 1, wherein the pitch drive control devices of the pitch drive controller are configured to exchange one or more of the data types defined as follows:
setpoints,
actual values,
measured values,
calculated values,
operating parameters of the pitch drive control device, including the software status of application software and/or firmware or an installable data processing program with the application software and/or the firmware or software updates,
time information, and/or
data packets from safety modules.

5. A pitch drive control device for actuating a pitch drive motor, the pitch drive control device comprising:
an electronic actuation unit;
a control output to the pitch drive motor;
a computing unit with at least one processor configured to operate the pitch drive control device; and
a local communication connection configured such that the pitch drive control device is connectable with other pitch drive control devices of the wind turbine in a cross-communication via the local communication connection.

6. The pitch drive control device according to claim 5, wherein the local communication connection comprises a wired electrical and/or optical interface.

7. The pitch drive control device according to claim 5, further comprising integrated and/or connectable sensors for capturing measured values, wherein the computing unit is configured to process the captured measured values.

8. The pitch drive control device according to claim 5, further comprising a safety module, in which safety functions are implemented that are executable based on data captured and processed in the safety module, wherein the captured data at least also contains data received from at least one of the other pitch drive control devices in the cross-communication, and wherein the computing unit is configured to evaluate the captured data in the safety module.

9. The pitch drive control device according to claim 5, wherein the computing unit of the pitch drive control device is configured to transmit measured values, setpoints and/or calculation values for the rotational adjustment of the rotor blade to the other pitch drive control devices connected in the cross-communication and/or to receive the measured values, setpoints and/or calculation values from the other pitch drive control devices, and to intervene locally in the pitch drive control based on the received measured values, setpoints and/or calculation values.

10. The pitch drive control device according to claim 5, wherein the computing unit of the pitch drive control device is configured to receive measured values, setpoints and/or calculation values from the other pitch drive control devices and to check measured values and/or calculation values captured in the pitch drive control device against an expected value from the measured values, setpoints and/or calculation values received from the other pitch drive control devices.

11. The pitch drive control device according to claim 5, further comprising an input interface with a user input device and at least one display device.

12. The pitch drive control device according to claim 5, wherein the computing unit of the pitch drive control device is configured to transmit setting parameters of the pitch drive control device and/or an installable image of the software to another one of the other pitch drive control devices via the cross-communication and to store the setting parameters and/or the image of the software in the other pitch drive control device.

13. The pitch drive control device according to claim 12, wherein the computing unit of the pitch drive control device is configured to retrieve the setting parameters of the pitch drive control device and/or the installable image of the software from one of the other pitch drive control devices via the cross-communication and to set the setting parameters and/or the image of the software up in a computing unit of a substituted pitch drive control device when one of the pitch drive control devices of the wind turbine is replaced.

14. A method for controlling the pitch drive controller of the wind turbine according to claim 1, the method comprising:
the computing units of at least two of the pitch drive control devices communicating with each other, and the computing units exchanging data with each other and/or storing data via the cross-communication.

15. The method according to claim 14, further comprising the computing units of the pitch drive control devices carrying out at least one of the following method steps:
transmitting and storing the setting parameters of one of the pitch drive control devices and/or an installable image of the software of this one of the pitch drive control devices to another of the pitch drive control devices by means of the cross-communication;
reading out the setting parameters and/or the stored installable image of the software stored in one of the pitch drive control devices by means of the cross-communication and installing them in another of the pitch drive control devices;
receiving measured values and/or setpoints and/or calculation values from other pitch drive control devices by means of the cross-communication and checking a measured value and/or calculation value captured in the pitch drive control device itself against an expected value which is derived from measured values and/or setpoints and/or calculation values received from the other pitch drive control devices;

sending measured values and/or setpoints and/or calculation values for rotational adjustment of the rotor blade to other pitch drive control devices connected in the cross-communication;

receiving measured values and/or setpoints and/or calculation values for rotational adjustment of the rotor blade from the other pitch drive control devices by means of the cross-communication and local intervention in the pitch drive control based on the measured values and/or setpoints and/or calculation values received; and/or receiving data also at least from at least one pitch drive control device by means of the cross-communication and evaluating the data in the safety module for the purpose of implementing safety functions.

* * * * *